United States Patent [19]
Morishita et al.

[11] Patent Number: 5,747,186
[45] Date of Patent: May 5, 1998

[54] CELL AND MODULE BATTERY OF SEALED NICKEL-METAL HYDRIDE STORAGE

[75] Inventors: Nobuyasu Morishita, Fujiidera; Shinji Hamada, Hirakata; Hiromu Matsuda, Kawabe-gun; Munehisa Ikoma, Shiki-gun, all of Japan

[73] Assignee: Matsushita Electric Industrial Co., Ltd., Osaka-fu, Japan

[21] Appl. No.: 562,132

[22] Filed: Nov. 22, 1995

[51] Int. Cl.$^6$ .................................................. H01M 10/30
[52] U.S. Cl. ........................ 429/53; 429/223; 429/206
[58] Field of Search ............................ 429/218, 148, 429/53, 206, 223

[56] References Cited

U.S. PATENT DOCUMENTS

| | | | |
|---|---|---|---|
| 729,550 | 6/1903 | Condict | 429/148 |
| 754,858 | 3/1904 | Edison | 429/148 |
| 3,623,917 | 11/1971 | Chassoux | 429/148 |
| 5,132,177 | 7/1992 | Kawano et al. | 429/206 |
| 5,149,383 | 9/1992 | Seri et al. | |
| 5,242,656 | 9/1993 | Zhang et al. | 420/417 |
| 5,510,203 | 4/1996 | Hamada et al. | 429/53 |

FOREIGN PATENT DOCUMENTS

| | | |
|---|---|---|
| 0 450 590 A1 | 10/1991 | European Pat. Off. |
| 0 567 132 A1 | 10/1993 | European Pat. Off. |
| 0 587 974 | 3/1994 | European Pat. Off. |
| 0 587 974 A1 | 3/1994 | European Pat. Off. |
| 0 612 856 | 8/1994 | European Pat. Off. |
| 0 669 663 A1 | 8/1995 | European Pat. Off. |

OTHER PUBLICATIONS

Rubin et al., "A Correlation of the Solution Properties and the Electrochemical Behavior of the Nickel Hydroxide Electrode...", J. Electrochem. Soc., vol. 118, pp. 428–432, Mar. 1971.

Weast, ed., "Handbook of Chemistry and Physics", 53rd ed., p. D–204, (no monfh available), 1972.

I. Matsumoto, "New Storage Battery Using Hydrogen Storage Alloy," *Kinou Zairyou*, pp. 22–31 (Mar. 1989): in Japanese (partial English translation of p. 26 supplied).

*Primary Examiner*—Prince Willis, Jr.
*Assistant Examiner*—Carol Chaney
*Attorney, Agent, or Firm*—Panitch Schwarze Jacobs & Nadel, P.C.

[57] ABSTRACT

A cell for sealed nickel-metal hydride storage battery having a high energy density and a long cycle life is disclosed. It comprises a battery casing made of a synthetic resin which accommodates a power-generating unit including a hydrogen storage alloy negative electrode whose hydrogen equilibrium pressure is 0.01–0.1 MPa at 45° C., when H/M=0.5, and a lid for sealing an open end of the casing provided with a safety vent whose operation pressure is 0.2–0.8 MPa. A pressure-resistant strength of the battery casing is in a range of 0.7–2.0 MPa and set higher than the operation pressure of the safety vent by 0.5 MPa or more.

13 Claims, 2 Drawing Sheets

CELL AND MODULE BATTERY OF SEALED NICKEL-METAL HYDRIDE STORAGE

BACKGROUNDS OF THE INVENTION

1. Field of the Invention

The present invention relates to a module battery of sealed nickel-metal hydride storage battery using a battery casing made of a synthetic resin and a cell for making up the module battery.

2. Description of the Prior Art

Recently, environmental destruction in global scale is rapidly progressing, and exhaust gas from gasoline engine automobiles is taken up as one of the causative factors for it. In order to cope with this problem, development of electric vehicles is progressed rapidly, but this largely depends on the development of the batteries as the power supply sources for driving the electric vehicles.

As a battery for driving these electric vehicles, there is an ever-increasing demand for the development of the nickel-metal hydride storage batteries. The nickel-metal hydride storage batteries have a large energy output, a high energy density and a long service life as compared with the conventional lead-acid storage battery, and contain no environment-polluting substance such as cadmium as in the nickel-cadmium storage batteries.

The nickel-metal hydride storage batteries are however requires a sealing technique for withstanding a high pressure, because the casing of these batteries is originally under high pressure brought by hydrogen which is one of the fundamental reactive substances. In the prior art cylindrical nickel-metal hydride storage battery of small size, a metal casing having a high pressure-resistant performance is used, and the metal casing is sealed by caulking to obtain a gas-tight sealing of the battery casing. Meanwhile, in the prior art rectangular nickel-metal hydride storage battery of small size, the metal casing is welded by means of a laser to obtain a sealed state.

These prior art nickel-metal hydride storage batteries are small in size and thus it is possible to rely on the prior art technology for obtaining a pressure-resistant structure of the casing for the batteries. In the large-sized batteries as those employed in the above-mentioned applications to the electric vehicles for instance, it is disadvantageous to employ a metal casing in view of its heavy weight, low energy density and high manufacturing cost. There is still another unsolved problem, that is, safety against possible collision, which is the most serious problem for the battery as the mobile power supply source. Thus, there is a strong demand for a low cost and safe casing made of a resin.

The prior art resin casings have been designed in general for a lead-acid storage battery completely free from a high pressure inside the casing. The prior art casings, therefore, have not been such a structure that takes into account a high pressure state encountered during charging and discharging cycles of the nickel-metal hydride storage battery.

If such prior art casing is employed in the nickel-metal hydride storage battery, the pressure inside the casing rises by the oxygen gas generated from the positive electrode at the time of overcharging to expand the casing, which sometimes results in rapture or explosion of the casing by the pressure. Besides, the conventional safety valve has a problem such that egress of the generated gas outside the casing causes a decrease in water contained in the electrolyte, which finally results in firing of the battery, because it is not designed in consideration of the maintenance of high pressure as mentioned previously.

SUMMARY OF THE INVENTION

In view of the above-mentioned problems, the primary object of the present invention is to provide a sealed nickel-metal hydride storage battery having a high energy density and a long cycle life by maintaining a suitable state of inner pressure and a high utilization of active materials.

Another object of the present invention is to provide a light weight and low cost sealed nickel-metal hydride storage battery which can efficiently dissipate the heat generated in the battery at the time of charging and discharging out of the battery system.

It is a still other object of the present invention to provide a safe sealed nickel-metal hydride storage battery which can be used as a large size mobile power supply source for driving an electric vehicle.

The present invention provides a cell for sealed nickel-metal hydride storage battery comprising:

a vessel made of a synthetic resin which accommodates a power-generating unit including;

a negative electrode composed mainly of hydrogen storage alloy, a positive electrode composed mainly of a nickel oxide, a separator placed between both electrodes, and an alkaline electrolyte;

a lid for sealing an open end of the above-mentioned battery vessel, and a resettable safety vent provided on the lid; wherein, a hydrogen equilibrium pressure of the above-mentioned hydrogen storage alloy is 0.01–0.1 MPa at 45° C., when the atomic ratio of the absorbed hydrogen to the alloy H/M is 0.5, an operation pressure of the above-mentioned safety vent is 0.2–0.8 MPa, and a pressure-resistant strength of the battery casing configured with the above-mentioned vessel and lid is in a range of 0.7–2.0 MPa and set higher than the operation pressure of the safety valve by 0.5 MPa or more.

4/10

The present invention also provides a module battery having a plurality of cells for sealed nickel-metal hydride storage battery comprising:

a vessel having a plurality of cells made of a synthetic resin which accommodates a power-generating unit including;

a negative electrode composed mainly of hydrogen storage alloy, a positive electrode composed mainly of a nickel oxide, a separator placed between both electrodes, and an alkaline electrolyte;

a plurality of lids each sealing respective open ends of the cells in the above-mentioned vessel, and a plurality of resettable safety vents provided on the respective lids; wherein, a hydrogen equilibrium pressure of the above-mentioned hydrogen storage alloy is 0.01–0.1 MPa at 45° C., when the atomic ratio of the absorbed hydrogen to the alloy H/M is 0.5, an operation pressure of the above-mentioned safety valve is 0.2–0.8 MPa, and a pressure-resistant strength of the battery casing configured with the above-mentioned vessel and lid is in a range of 0.7–2.0 MPa and set higher than the operation pressure of the safety vent by 0.5 MPa or more.

A module battery for a sealed nickel-metal hydride storage battery in accordance with the present invention is configured by stacking 5–40 of the above-mentioned cells in one direction and by electrically connecting them each other, wherein the above-mentioned cells are tightly bound in a direction of stacking with binding members which connect end plates provided on both ends of the stacked assembly, and spaces for allowing air flow between the neighboring cells are formed by a plurality of parallel ribs formed in butted relation with each other on the outer surfaces of the side wall of the above-mentioned battery casing in the direction of stacking.

In the above-mentioned configuration, a theoretical discharge capacity ratio of the negative electrode to the positive electrode is preferably from 1.2 to 2.0.

It is further preferable that the amount of the electrolyte is from 1.3 $cm^3$ to 2.8 $cm^3$ per 1 Ah of the theoretical discharge capacity of the positive electrode.

It is also preferable that the electrolyte is made up of two components of potassium hydroxide and lithium hydroxide, or three components of sodium hydroxide and the above-mentioned two components, and its density is from 1.2 $g/cm^3$ to 1.4 $g/cm^3$.

It is suitable that the vessel and the lid are made of a synthetic resin having a bending elastic modulus of from 14,000 $kg/cm$ to 28,000 $kg/cm^2$.

The vessel of the cells for making up the module battery by stacking the cells is preferably to have a thickness of from 1 mm to 3 mm for the side wall of the above-mentioned vessel, and the above-mentioned ribs are preferably to have a rib height of from 1 mm to 2 mm, a rib interval of from 10 mm to 15 mm and a rib width of from 3 to 10 mm.

In the sealed nickel-metal hydride storage battery in accordance with the present invention configured as aforementioned, as the proportion of the hydrogen partial pressure occupying the battery internal pressure is appropriately adjusted, the battery is free from such a possibility of effecting a hydrogen-releasing reaction as a competitive reaction with the normal charging and discharging reactions at the time of overcharging. It is also free from such a probability of a shortage of the hydrogen gas necessary for returning the oxygen gas generated from the positive electrode to water. Therefore, the battery internal pressure is suitably kept without disturbance of the regeneration of the active material by the charging, thereby to maintain the level of the utilization high.

In addition, since the operation pressure of the safety vent is set higher than the maximum battery internal pressure, the battery is free from such an inconvenience that the safety vent is allowed to actuate during the terminating period of the charging operation to cause a decrease of the electrolyte, as a result of which there occur a decrease in the discharge capacity of the cell and firing inside the battery.

Further, since the relationship between the operation pressure of the safety vent and the pressure-resistant strength of the battery casing is set to be appropriate, the battery is free from such a phenomenon that a space is created between the electrode group and the casing by the expansion of the casing, thereby to make it difficult to dissipate the heat generated inside the cell out.

In addition, a module battery in accordance with the above-mentioned configuration includes a plurality of the cells stacked and bound securely in the stacking direction by binding members which connect end plates provided on both ends with each other, and the individual cells are arranged in butted relation with each other by a plurality of parallel ribs formed on the outer surface of the battery casing in the stacking direction, which ensures spaces allowing air flow between the cells. Therefore, the heat dissipation is properly effected.

Further, by appropriately selecting the bending elastic modulus of the material constituting the battery casing and the thickness thereof, and suitably arranging the ribs, it is possible to make the battery casing to withstand the binding force of the binding members and the end plates and the expansion of the electrode group, and to effectively perform the heat dissipation through the side wall of the battery casing.

As has been described previously and will be apparent from the following description on the preferred embodiment, according to the present invention, it is possible to obtain a sealed nickel-metal hydride battery having a high safety, a large energy density, and a long cycle life. The sealed nickel-metal hydride storage battery can hold an appropriate battery internal pressure, and thus is free from a deformation or a breakage of the battery casing, a decrease in the discharge capacity and a fire catching during the repeated charging and discharging operations and a long-term service.

In addition to this, according to the present invention, it is also possible to provide a medium-sized or a large-sized sealed nickel-metal hydride storage battery system having a superior reliability.

While novel features of the present invention are set forth in the precedings, the invention, both as to organization and content, can be further understood and appreciated, along with other objects and features thereof, from the following detailed description on the preferred embodiment and examples thereof when taken in conjunction with the attached drawings.

DESCRIPTION OF THE PREFERRED EMBODIMENTS

In the following paragraphs, preferred configurations of the module battery of the sealed nickel-metal hydride storage battery and the cells making up the module battery will be described with reference to the accompanying drawings.

Figure 1:
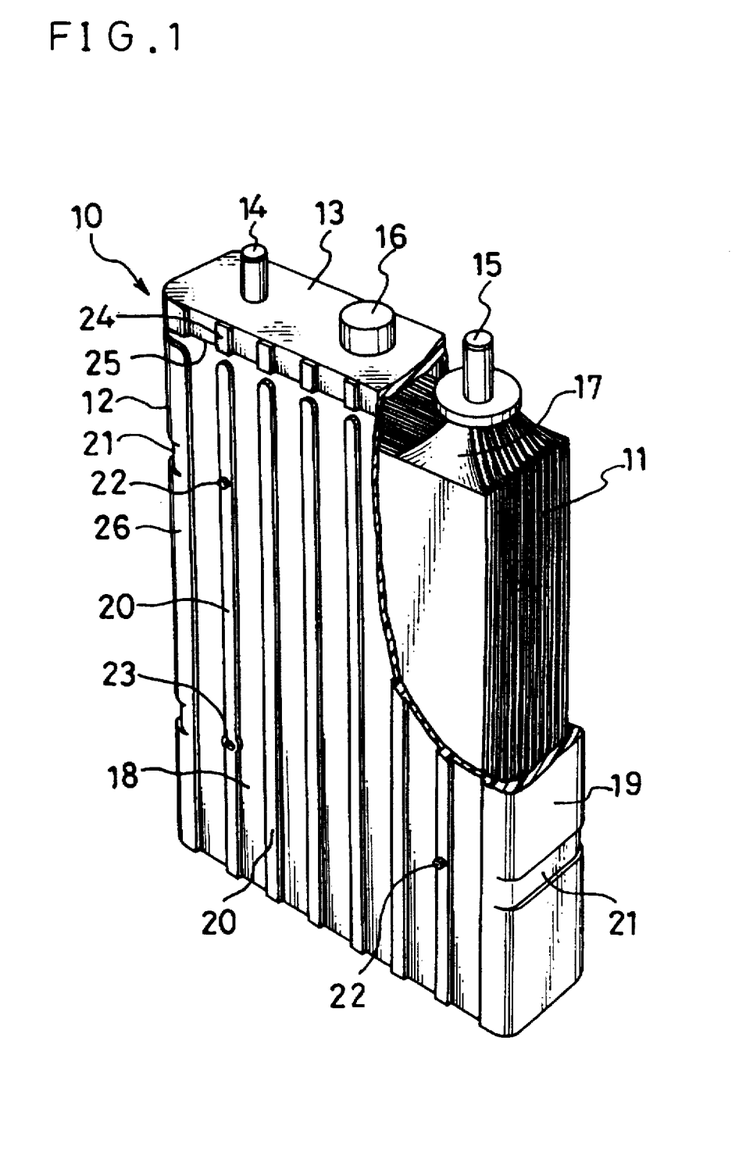
FIG. 1 is a partially-cutout perspective view of a cell of a sealed nickel-metal hydride storage battery in accordance with an embodiment of the present invention.

As shown in FIG. 1, a cell 10 includes a rectangular battery casing made of a synthetic resin such as polypropylene accommodating an electrode group 11 and an electrolyte. The battery casing comprises a vessel 12 of a synthetic resin and a lid 13 of the same synthetic resin material as that of the vessel 12 which is thermally welded to the upper opening of the vessel 12. The lid 13 has a positive terminal 14 and a negative terminal 15 fixed thereto made of nickel-plated iron, and a safety vent 16. The negative terminal 15 has a displaced portion at the lower end thereof (not shown) connected by welding to lead members 17 of the negative electrode plates. The upper portion of the negative terminal 15 is mounted on the lid 13 in both liquid- and gas-tight fashion. The lower end of the positive electrode terminal 14 is connected to lead members of the positive electrode plates (not shown).

The vessel 12 includes wide side walls 18 located in the stacking direction of the cells, narrow side walls 19 and a bottom wall. A plurality of ribs 20 for placing the cells in butted relation with each other are arranged longitudinally in parallel to each other in a spaced relationship on the outer surface of the side wall 18. On the other hand, two recesses 21 for positioning the binding members which will be described later are arranged on the outer surface of the side wall 19. The end ribs have a protrusion 22 and a recess 23 in reversed positions for positioning the ribs in butted relation.

The lid 13 has a plurality of ribs 24 similar to the ribs 20 of the vessel 12 on the outer surface of the wider side wall.

The welded portion between the lid 13 and the vessel 12 is designated by numeral 25 and the portion of the welding margin externally protruded by welding is removed by grinding.

The narrower side wall 19 of the vessel 12 is thicker than the side wall 18 and continuously formed with the rib 26 on the outer side of the rib 20. The lid 13 has a similar configuration to this.

Figure 2:
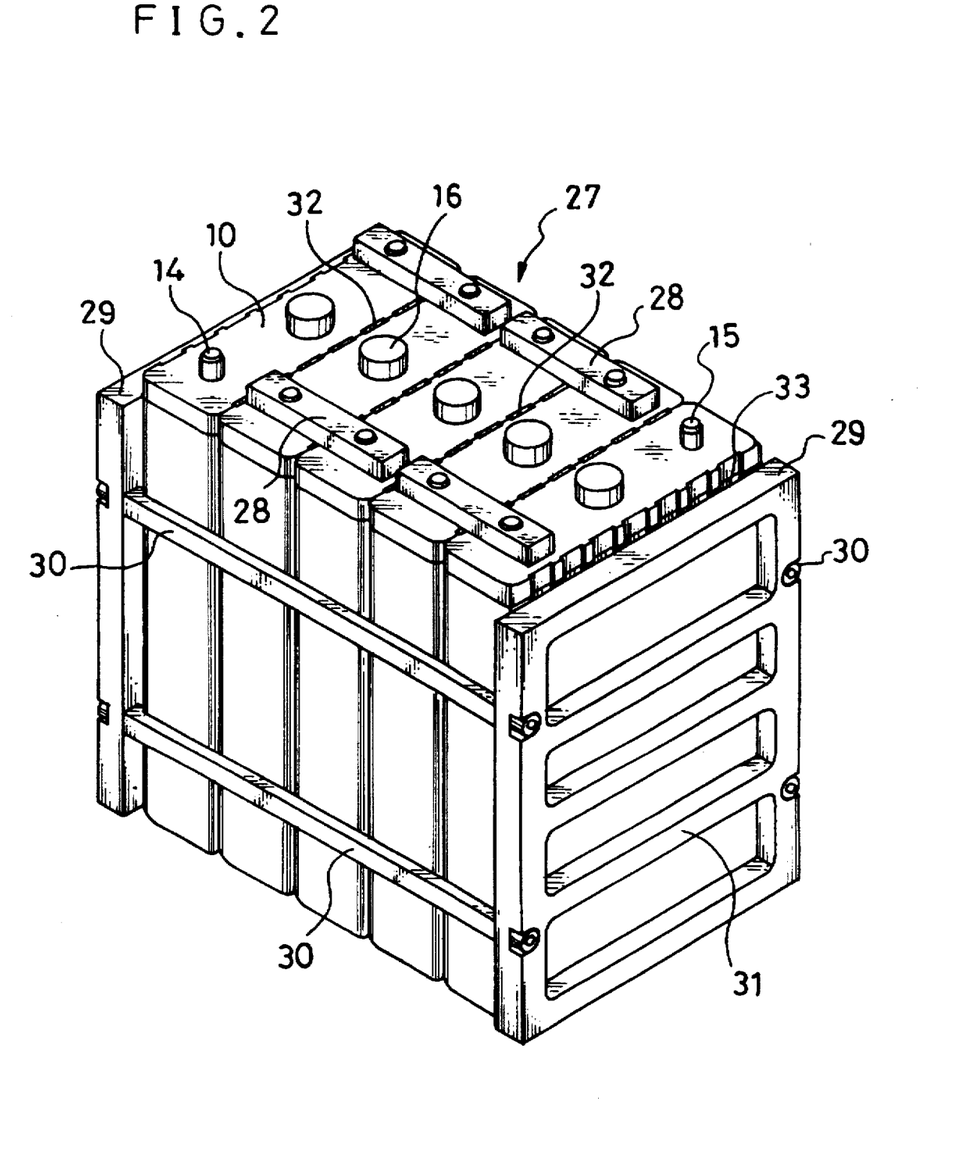
FIG. 2 is a perspective view showing a module battery in the embodiment of the present invention.

FIG. 2 shows a module battery 27 having five of the above-mentioned cells 10 electrically connected in series. Adjacent cells have the ribs 20 and 26 of the vessel 12 butted with each other, and the protrusion 22 formed on the rib 20 of one of the cells is fitted in the recess 23 of the rib 20 of the other cell for securing relative positions. Further, the positive and negative terminals 14 and 15 of adjacent cells are connected by means of connecting conductors 28.

The stacked assembly of the five cells connected in series in this manner has aluminum end plates 29, 29 kept in contact with the ends thereof. These plates are coupled by four prismatic binding members 30 thereby to tightly bind the cells with each other not to be separated by increased battery internal pressure or expansion of the electrodes. Each of the end plates 29, 29 has reinforcing ribs 31. The dimension of the end plate 29 and the binding member 30 is determined taking account of the expansion force of the electrode group, the number of stacked cells and the battery internal pressure. In the embodiments described below, the thickness of the end plate 29 including the height of the ribs is 10 mm, and the cross section of the binding members has a shape of a 8×8 mm prism.

In the module battery configured as mentioned above, spaces 32 are formed between the ribs 20 and 26. Spaces 33 corresponding to the height of the ribs 20 are formed also between the end cell and the end plate 29.

In the above-mentioned cases, instead of the prismatic structure, cylindrical or band-like structure may be used alternatively for the binding member.

Also, the ribs 20 which are continuously formed along the longitudinal direction of the battery casing may alternatively be divided into several sections. The advantage of the continuous structure, however, is a fixed direction of air flow for an improved heat dissipation.

EXAMPLE 1

An electrode mixture containing nickel hydroxide powder as a main component was filled in a foamed nickel porous substrate. This substrate was then pressed by a pressure roller and cut to a predetermined size, thereby to prepare a nickel positive electrode plate having a capacity of 10 Ah per plate. Also, a powder of hydrogen storage alloy whose composition was represented by the formula $MmNi_{3.6}Co_{0.7}Mn_{0.4}Al_{0.4}$ (Mm: misch metal) was applied to a punched or perforated metal sheet together with a binder, pressed by a pressure roller and cut to a predetermined size, thereby to prepare a hydrogen storage alloy negative electrode having a capacity of 13 Ah per plate.

Each of these positive and negative electrode plates was wrapped in a bag-shaped separator. Ten positive electrode plates and 11 negative electrode plates were alternately piled to configure an electrode group. Theoretical capacity ratio of the negative electrode plate to the positive electrode plate was 1.43. In this case, the electrode group 11 was configured to have a thickness, equal to about 95% of the inner size of the vessel 12. The positive and negative electrode plates of the electrode group 11 were connected to respective terminals with lead members and inserted into the vessel made of polypropylene as described above. Then, 180 cm$^3$ of an alkaline electrolyte composed of two components of potassium hydroxide and lithium hydroxide and adjusted to a density of 1.3 g/cm$^3$ was injected therein to form a cell described above. In this case, the amount of the electrolyte per 1 Ah of the theoretical capacity of the positive electrode was 1.8 cm$^3$.

Subsequently, the open end of the vessel 12 was closed and sealed with a lid 13 provided with a safety vent 16 having an operation pressure of 0.3 MPa to complete a cell 10 described above.

The vessel 12 contained side walls 18 of 2 mm thick, ribs 20 and 26 of 1.5 mm high, the ribs 20 of 5 mm wide spaced 12 mm between the ribs, and side walls 19 and a bottom wall of 4 mm thick. Also, the lid 13 was 4 mm in thickness. In this case, pressure-resistant strength of the battery casing configured with the vessel and the lid thermally welded thereto was 0.8 MPa. The pressure-resistant strength of the battery casing was determined by a maximum pressure applied immediately before the development of the cracks in the battery casing, based on a test conducted on a battery casing configured with an empty vessel and a lid, to load a hydraulic pressure through an opening at the central part (which corresponds to the safety vent) of the lid.

The hydrogen storage alloy employed in this example has a hydrogen equilibrium pressure of 0.05 MPa at an atmospheric temperature of 45° C. at H/M of 0.5.

Throughout this description and claims, H/M is used as an index for indicating the amount of the stored hydrogen in the hydrogen storage alloy; H represents the number of stored hydrogen atoms and M represents the number of metal atoms constituting the hydrogen storage alloy. More specifically, when the number of metal atoms M contained in one molecule of the alloy represented by the formula $MmNi_{3.6}Co_{0.7}Mn_{0.4}Al_{0.4}$ is 6.1, and the number of stored hydrogen atoms in one molecule of the hydrogen storage alloy is 3.05, then H/M=0.5 is derived therefrom.

The cell of the above-mentioned configuration was charged for 15 hours at a current of 10 A and discharged at a current of 20 A until the cell voltage decreased to 1.0 V as an initial charging and discharging operation. As a result, the electrode groups expanded and came into close contact with the inner faces of the side walls of the vessel 12. The discharge capacity of this cell was restricted by the positive electrode, and this cell had a battery capacity of 100 Ah.

The hydrogen equilibrium pressure at the time H/M=0.5, which is an index for indicating a hydrogen storing capability of a hydrogen storage alloy, depends largely upon the amount of lanthanum contained in the misch metal (Mm) in the hydrogen storage alloy. In order to elucidate the dependency, comparative hydrogen storage alloy samples having varying lanthanum contents ranging from 7 wt % to 33 wt % with different hydrogen equilibrium pressures were prepared. These alloy samples were employed for preparing the negative electrodes having the same weight as described above, and the prepared negative electrodes were then used in configuring the cells of the same structure as described above. Table 1 below summarizes the lanthanum contents, the results of the measurements on the hydrogen equilibrium pressure (P) at an atmospheric temperature of 45° C. at H/M of 0.5, and the battery internal pressure as well as the discharge capacity calculated after charging for 15 hours at a current of 10 A and discharging at a current of 20 A until the cell voltage decreased to 1.0 V.

TABLE 1

| Cell No. | La Content (wt %) | Pressure P (MPa) | Maximum battery internal pressure (MPa) | Discharge capacity (Ah) |
|---|---|---|---|---|
| 1 | 33 | 0.007 | 0.60 | 90 |
| 2 | 25 | 0.010 | 0.08 | 92 |
| 3 | 14 | 0.050 | 0.10 | 98 |
| 4 | 9 | 0.100 | 0.15 | 95 |
| 5 | 7 | 0.150 | 0.30 | 80 |

As is obvious from Table 1, the hydrogen equilibrium pressure (P) of the hydrogen storage alloy, used in the cell No. 5 at an atmospheric temperature of 45° C., is as high as 0.15 MPa and a proportion of a hydrogen partial pressure occupying the battery internal pressure is large accordingly. And, as a result, a hydrogen releasing reaction, which is a competitive reaction occurring simultaneous with the usual charging reaction, is likely to occur at the time of overcharging and thus the maximum battery internal pressure is high. In addition, since the above-mentioned competitive reaction is likely to occur, the progress of the charging operation is hindered and the utilization of the active material is lowered, thereby to decrease the measured cell discharge capacity.

In contrast to this, the hydrogen equilibrium pressure (P) of the hydrogen storage alloy, used in the cell No. 1 at an atmospheric temperature of 45° C. at H/M of 0.5, is as low as 0.007 MPa and a proportion of a hydrogen partial pressure in the battery internal pressure is small accordingly. And, as a result, hydrogen gas is absent sufficient for allowing reaction to return the oxygen gas generated from the positive electrode at the time of overcharging to water, thereby to lower the battery internal pressure. Therefore, when the cell is subjected to the overcharging operation, the battery internal pressure rapidly rises and thus the maximum battery internal pressure is raised accordingly.

From the previous findings, it is concluded that it is desirable to configure a cell by employing a hydrogen storage alloy having the hydrogen equilibrium pressure (P) in a range of from 0.01 MPa to 0.1 MPa at an atmospheric temperature of 45° C. at H/M of 0.5.

EXAMPLE 2

The cells No. 2, 3 and 4 of Example 1 were subjected to an overcharging test. Each of the cells in a completely discharged state was charged continuously at a current of 10 A, and the maximum battery internal pressure at that time was measured. As a result, it was found that the maximum battery internal pressure of the cells No. 2, 3 and 4 was 0.2 MPa, 0.3 MPa and 0.8 MPa, respectively. If the operation pressure of the safety vent is set lower than these maximum battery internal pressures, the safety vent is allowed to actuate during the terminating period of the charging operation and the gas generated in the cell by the decomposition of water is released outside. As a result, the amount of the electrolyte in the cell gradually decreases and the discharge capacity of the cell decreases accordingly, thereby to invite a hazard of fire caused by the dry-up of the electrolyte.

Therefore, it is desirable to set the operation pressure of the safety vent higher than the maximum battery internal pressure so as to be actuated only in case of emergency. Specifically, in case of configuring the cell by employing a hydrogen storage alloy having a hydrogen equilibrium pressure (P) in a range of from 0.01 MPa to 0.1 MPa at an atmospheric temperature of 45° C. when H/M=0.5, it is desirable to set the operation pressure of the safety vent in a range from 0.2 MPa to 0.8 MPa.

EXAMPLE 3

Another series of cells similar to that described above was produced except for the following points. The cells employed a negative electrode configured with a hydrogen storage alloy having a hydrogen equilibrium pressure (P) of 0.05 MPa at an atmospheric temperature 45° C. when H/M=0.5, and a power generating unit of a configuration which demonstrated a maximum battery internal pressure of 0.3 MPa at the overcharging test in Example 2, as well as a vessel having a pressure-resistant strength ranging from 0.6 MPa to 2.1 MPa as listed in Table 2 below. These cells were subjected to an overcharging test (charging=10 A, continuous). The results of the observations on the states of the battery casings of the cells are summarized in Table 2 below.

TABLE 2

| Cell No. | Pressure-resistant strength of the battery casing (MPa) | Result of the test |
|---|---|---|
| 6 | 0.6 | Catch fire |
| 7 | 0.7 | No Problem |
| 8 | 2.0 | No Problem |
| 9 | 2.1 | No Problem |

In the cell No. 6 configured by employing the battery casing having a pressure resistant strength of 0.6 MPa, the battery casing expands with the rise in the battery internal pressure because its pressure-resistant strength is low, and creates a space between the electrode group and the vessel. Once such space is created, it becomes difficult to dissipate the heat generated inside the cell and the temperature inside the cell rises accordingly, thereby to decrease the hydrogen storing ability of the hydrogen storage alloy. If the ability decreases, the battery internal pressure increases to actuate the safety vent, thereby to invite a dry-up of the electrolyte and a decrease in the discharge capacity.

In the cell No. 7 configured with the battery casing having a pressure-resistant strength of 0.7 MPa which is set in compliance with the maximum battery internal pressure obtained in the overcharging test in Example 2 and is higher than the operation pressure of the safety vent by 0.5 MPa, the battery casing does not expand and any space will not be created between the electrode group and the vessel. With this configuration, it is possible to effectively dissipate the heat generated inside the cell outside the vessel and there is no problem.

It is found that the pressure-resistant strength of the battery casing is desirably higher than the operation pressure of the safety vent by 0.5 MPa or more.

In the cell No. 9 configured with the battery casing having a pressure-resistant strength of 2.1 MPa, the wall thickness of the vessel is designed to be 4 mm in order to increase the pressure-resistant strength of the battery casing. The large wall thickness hindered the conduction of the heat generated in the cell, and the temperature inside the cell elevated accordingly, which resulted in a decrease in the hydrogen storing ability of the hydrogen storage alloy. If the hydrogen storing ability decreases, the battery inner pressure increases to actuate the safety vent, thereby to invite a dry-up of the electrolyte and a decrease in the discharge capacity.

As clearly shown in the above discussion, in case of employing a hydrogen storage alloy having a hydrogen equilibrium pressure in a range from 0.01 MPa to 0.1 MPa at an atmospheric temperature of 45° C. when H/M=0.5, it is desirable that the pressure-resistant strength of the battery casing is in a range of 0.7 MPa and 2.0 MPa which is higher by 0.5 MPa than the operating pressure of the safety vent determined in compliance with the maximum battery internal pressure obtained in the overcharging test. In this example, a cell was used as the battery, similar results can be obtained with a module battery made up of 2–10 power generating units by electrically connecting them together.

EXAMPLE 4

Another set of cells was prepared in a manner similar to that in Example 1 except for the employments of the power generating units configured with varying discharge capacity ratios of the negative electrode to the positive electrode. These cells were charged for 12 hours at a current of 10 A and then discharged at a current of 20 A until the cell voltage decreased to 1.0 V for measuring the discharge capacities, and the energy densities were derived from the following equation:

$$\text{Energy density} = \frac{\text{Discharge capacity} \times \text{Average voltage during discharging}}{\text{Weight of cell}}$$

The energy density indicates the amount of energy which can be retained in the cell and serves as an important factor in comparing the performance of mobile power supply source, and thus there is an ever-lasting need for increasing this numerical value. In addition to this, these cells were subjected to a cycle life test conducted under similar charging and discharging conditions. The "cycle life" used here is defined as the number of the charging and discharging cycles until the discharge capacity of a cell or a module battery decreases to 80% of its initial value. Table 3 below summarizes the results of these measurements.

TABLE 3

| Cell No. | Discharge capacity ratio (Negative electrode/ Positive electrode) | Energy density (Wh/kg) | Cycle life (cycle) |
|---|---|---|---|
| 10 | 1.1 | 77.5 | 350 |
| 11 | 1.2 | 74.8 | 850 |
| 12 | 1.4 | 70.6 | 900 |
| 13 | 1.6 | 66.5 | 1000 |
| 14 | 1.8 | 63.0 | 1050 |
| 15 | 2.0 | 60.1 | 1100 |
| 16 | 2.1 | 54.0 | 1150 |

As is obvious from Table 3, the smaller the discharge capacity ratio is, the larger the energy density becomes. This may be because if the discharge capacity ratio is made small, the discharge capacity of the negative electrode is also made small and the weight occupied by the negative electrode plate decreases accordingly, as a result of which the cell becomes lighter and the energy per weight which can be stored in the cell increases.

The energy density of the cell No. 16 with a discharge capacity ratio of 2.1 remarkably decreased. The reason for this is that in addition to decreased energy density due to the increase in the weight of the negative electrode, the total thickness of the cell increases, because of the thickened negative electrode plate, and as a result, the heat generated in the cell is hard to dissipate and accumulates inside the cell, thereby to lower the charging efficiency. It is therefore desirable to select the discharge capacity ratio of 2.0 or smaller.

It is also found that the larger the discharge capacity ratio is, the longer the cycle life becomes. The reason for this is that the discharge capacity of the negative electrode gradually decreases with the progress of the repeated charging and discharging cycles, because the hydrogen storage alloy contained in the negative electrode deteriorates by possible oxidation or solubilization during the repeated charging and discharging cycles.

If the discharge capacity ratio is 1.2 or larger, the hydrogen storage alloy excessively contained in the negative electrode can absorb the oxygen gas generated during the overcharging process. In contrast to this, in the cell No. 10 with a discharge capacity ratio of 1.1, the hydrogen storage alloy contained in the negative electrode can not sufficiently absorb the oxygen gas generated during the overcharging process and the battery internal pressure rises. If the battery internal pressure increases to 0.3 MPa or higher, the safety vent actuates to-release the gas confined in the cell, thereby to invite a decrease in the electrolyte in the cell. The repetition of this phenomenon at every cycle causes a dry-up of the electrolyte and deteriorates the service life. If such charging and discharging cycles are further repeated, a cause for catching a fire is created.

Based on the above findings, it is desirable to select the theoretical discharge capacity ratio of the negative electrode to the positive electrode from 1.2 to 2.0. In this example, a cell was used for the experiment, similar results can be obtained with a module battery made up of 2 or more cells by electrically connecting them together.

EXAMPLE 5

Another series of the cells similar to that of the sealed nickel-metal hydride storage battery in accordance with Example 1 of the present invention was prepared by changing the amount of the electrolyte. The utilizations of the positive electrodes were compared by charging these cells for 12 hours at a current of 10 A and discharging at a current of 20 A until the cell voltage decreased to 1.0 V, and the discharge capacities of the cells were measured at that time. In addition to this, these cells were subjected to cycle life tests conducted by repeating the charging and discharging under similar conditions. Table 4 below summarizes the results of these measurements.

TABLE 4

| Cell No. | Amount of electrolyte (cc) | Discharge capacity (Ah) | Cycle life (cycle) |
|---|---|---|---|
| 17 | 120 | 88 | 430 |
| 18 | 130 | 90 | 700 |
| 19 | 200 | 97 | 900 |
| 20 | 280 | 94 | 850 |
| 21 | 290 | 92 | 600 |

As is obvious from Table 4, the cell No. 17 with an electrolyte amount of 120 cc, which is insufficient for the nickel positive electrode, has a low utilization and a short cycle life. By contrast, the cell No. 21 whose electrolyte amount is 290 cc has a preferable utilization as high as 92% but has a shorter cycle life than that of the cell containing 280 cc electrolyte. The reason for this shorter cycle life is due to a large amount of the electrolyte. This leads to a lowering of the efficiency in the reaction at the negative electrode to absorb the oxygen gas generated from the positive electrode during the overcharging process and further to an inadvertent leakage of the gas or the electrolyte through the safety vent, if the cell is charged at a current of 10 A. Since the theoretical discharge capacity of the cells No. 18, 19 and 20 is 100 Ah, the amount of the electrolyte per 1 Ah is 1.3, 2.0 and 2.8 cc, respectively.

Based on the above-mentioned findings, it is concluded that the amount of the electrolyte is desirably in a range from 1.0 to 2.8 cc/Ah. In this example, a cell was used for the experiment, similar results can be obtained with a module battery made up of 2 or more individual cells by electrically connecting them together.

EXAMPLE 6

Another series of the cells similar to that of the sealed nickel-metal hydride storage battery in accordance with Example 1 of the present invention was prepared by changing the density of the electrolyte. The utilizations of the positive electrodes were compared at the time of charging these cells for 12 hours at a current of 10 A and discharging at a current of 20 A until the cell voltage decreased to 1.0 V. In addition to this, these cells were subjected to cycle life tests by charging and discharging under similar conditions. Table 5 below also summarizes the results of these measurements.

TABLE 5

| Cell No. | Density of electrolyte (g/cc) | Discharge capacity (Ah) | Cycle life (cycle) |
|---|---|---|---|
| 22 | 1.15 | 80 | 230 |
| 23 | 1.20 | 92 | 700 |
| 24 | 1.30 | 98 | 900 |
| 25 | 1.40 | 94 | 800 |
| 26 | 1.45 | 85 | 450 |

As is obvious from Table 5, the cell No. 22 whose electrolyte has a density of 1.15 g/cm$^3$ which represents a small ion quantity in the electrolyte has a poor conductive property between the electrode plates, and a low utilization as well as a short cycle life. By contrast, the cell No. 26 whose electrolyte density is 1.45 g/cm$^3$ has a relatively preferable utilization as high as 85% but has a short cycle life. The reason for this short cycle life is due to a high dissolution of the hydrogen storage alloy constituting the negative electrode into an aqueous solution of a high alkali concentration which reflects the high density of the electrolyte. The discharge capacity of the negative electrode gradually decreases with this dissolution.

Based on the above-mentioned findings, it is concluded that the density of the electrolyte is desirably in a range from 1.20 g/cm$^3$ to 1.40 g/cm$^3$. In this example, a cell was used for the experiment, a similar result can be obtained with a module battery made up of 2 or more cells by electrically connecting them together.

EXAMPLE 7

Another series of the cells similar to that of the sealed nickel-metal hydride storage battery in accordance with Example 1 of the present invention was prepared by changing the bending elastic modulus of the resin material for the casing. The measurement of the bending elastic modulus is performed in accordance with ASTN, D-790 and the resin materials each having a bending elastic modulus of 10,0000 kg/cm$^2$, 14,000 kg/cm$^2$, 28,000 kg/cm$^2$ and 32,000 kg/cm$^2$ were employed respectively as listed in Table 6 below. These cells were charged for 12 hours at a current of 10 A and discharged at a current of 20 A until the cell voltage decreased to 1.0 V, and compared for the utilization of the positive electrode. At the same time, these cells were subjected to cycle life tests performed under similar charging and discharging conditions. Table 6 below also summarizes the results of these measurements.

TABLE 6

| Cell No. | Bending elastic modulus of the casing material (kg/cm$^2$) | Discharge capacity (Ah) | Cycle life (cycle) |
|---|---|---|---|
| 27 | 10,000 | 88 | 350 |
| 28 | 14,000 | 98 | 900 |
| 29 | 28,000 | 98 | 900 |
| 30 | 32,000 | 98 | 180 |

As is obvious from Table 6, in the cell No. 27, whose casing made of low density polyethylene has a bending elastic modulus of 10,000 kg/cm$^2$, the rigidity of the casing against the battery internal pressure is small, which causes a deformation of the battery casing. The deformation produced a heat insulating layer of air between the electrode plate and the casing, and made it difficult to transmit the heat generated in the power generating unit outside the casing, whereby the heat was accumulated inside the cell and the charging efficiency decreased. As a consequence, the utilization fell to 88% and the cycle life was shortened. As for the cell No. 30 made of an ABS resin with a bending elastic modulus of 32,000 kg/cm$^2$, on the other hand, the cycle life is as short as 180 cycles. The reason for this may be that a material having a high bending elastic modulus is generally low in fragility, and the thermally welded portion between the vessel and the lid is likely to become fragile, so that the expansion of the electrode plates causes a cracking there and leads to the leakage of the electrolyte.

In consideration of the above-mentioned fact, an appropriate bending elastic modulus is from 14,000 kg/cm$^2$ to 28,000 kg/cm$^2$. In this example, polypropylene is used as the synthetic resin having a bending elastic modulus of from 14,000 kg/cm$^2$ to 28,000 kg/cm$^2$. It is also possible, however, to use denatured polyphenylene ether, polyamide or an alloy of one of them with polypropylene alternatively. In this example, a cell was used for the experiment, a similar result can be obtained with a module battery made up of 2 or more cells by electrically connecting them together.

EXAMPLE 8

A module battery as shown in FIG. 2 was configured using 5 cells as in Example 1 and connecting them in series together.

COMPARATIVE EXAMPLE 1

A module battery was prepared, in which no ribs were formed on the outer surface of the battery casing and 5 cells as in Example 1 were fixed at 3 mm intervals between the adjacent cells.

COMPARATIVE EXAMPLE 2

A module battery was prepared, using neither end plates nor binding members, with the cells connected to each other simply by conductors connecting the terminals thereof.

The module batteries configured as shown in Example 8, Comparative Examples 1 and 2 were subjected to a discharge capacity test and a cycle life test. The discharge capacity test was conducted at a current of 20 A until the battery voltage decreased to 5 V after the module battery involved was charged for 12 hours at a current of 10 A and allowed to stand still for one hour. The discharge capacity of the module battery was calculated with reference to the discharge time before the battery voltage has decreased to 5 V. Also, calculations for the respective cells were made with reference to the discharge time before the cell voltage decreased to 1 V. At the time of charging, the spaces between the cells, sides of the module battery and the surfaces of the end plates were exposed to air supplied from under the battery by means of a fan. The fan was regulated so that an average velocity of air passing through the spaces 32 was 1.0 m/sec. The environmental temperature was set to 20° C. The test results are summarized in Table 7 below.

The cycle life test was conducted by repeating the same conditions as the charging and discharging operation under which the discharge capacity was investigated. The test results are summarized in Table 8 below.

TABLE 7

|  | Example 8 | Comparative Example 1 | Comparative Example 2 |
|---|---|---|---|
| Module battery | 98 Ah | 82 Ah | 77 Ah |
| Cell 1 | 98 Ah | 84 Ah | 81 Ah |
|  | 35° C. | 42° C. | 50° C. |
| Cell 2 | 98 Ah | 83 Ah | 78 Ah |
|  | 35° C. | 44° C. | 52° C. |
| Cell 3 | 98 Ah | 80 Ah | 76 Ah |
|  | 35° C. | 48° C. | 54° C. |
| Cell 4 | 98 Ah | 82 Ah | 77 Ah |
|  | 35° C. | 46° C. | 53° C. |
| Cell 5 | 98 Ah | 85 Ah | 80 Ah |
|  | 35° C. | 44° C. | 51° C. |

TABLE 8

|  | Example 8 | Comparative Example 1 | Comparative Example 2 |
|---|---|---|---|
| Cycle life (cycle) | More than 900 | 350 | 320 |

As is obvious from Table 7, the module battery according to Example 8 of the present invention has a discharge capacity of 98 Ah which is 98% of the discharge capacity of the cell having a discharge capacity of 100 Ah. By contrast, the module batteries of the Comparative Examples 1 and 2 have the corresponding figures of 82 Ah and 77 Ah respectively, which are not more than 75 to 85% of the cell discharge capacity of 100 Ah.

Table 7 also shows the discharge capacity and the temperature of the electrode groups at the end of charging operation of the cells 1 to 5 making up the module battery. The number is attached to each cell in the order of stacking. The cells 1 and 5 are arranged at the ends and the cell 3 in the center of the module battery. The cells 1 through 5 configuring the module battery in accordance with the present invention display a similar discharge capacity and coincide with the characteristics of the module battery. This is because the heat generated by the electrode groups of each cell at the time of charging operation is dissipated sufficiently and uniformly by the air flowing upward through the spaces between the cells and the cell temperature increase is limited within 15° C. above the environmental temperature.

More specifically, the reason for securing a superior discharge capacity of Example 8 as shown in Table 7 is that the temperature in the battery at the time of charging of each cell making up the module battery is constantly at 35° C. and that each cell is charged uniformly and sufficiently under the temperature conditions not deteriorating the charging efficiency of the nickel positive electrode of each cell. Also, as shown in Table 8, the cell in accordance with the present invention has a superior cycle life performance even after 900 cycles of charging and discharging operations.

The module battery in accordance with Comparative Example 1 has cells with a casing having no recesses or protrusions on the outer surface thereof and has an intercellular space of 3 mm allowing passage of air flow. The casings of adjacent cells, however, are not in contact with each other. As shown in Table 7, the discharge capacity of the module battery of Comparative Example 1 is 82 Ah which is smaller than that of the module battery in accordance with the present invention. This is because when the casing is deformed by the increase in the battery inner pressure or expansion of the electrode groups at the time of charging operation, the omission of ribs, which otherwise might be required to hold the distance between adjacent cells, causes the intercellular width of the spaces to change with the deformation of casing, thereby to make the air flow fluctuate. As a result, even when air is supplied between the cells, heat hardly dissipates. Especially, the temperature of the cells located at the center of the module battery rises considerably due to the heat of the adjacent cells. Also, the discharge capacity of the cells becomes non-uniform and ranges from 80 to 85 Ah.

In addition to this, as shown in Table 8, the capacity of the module battery under consideration declines to only 50% of the initial discharge capacity after 350 cycles. This is probably due to the fact that the casing deformation is aggravated by repetitive charging and discharging operations and the resultant significant decrease in space width reduces the heat dissipation effect by ventilation. The battery temperature rises to deteriorate the performance of the negative electrode and reduce the discharge capacity.

By contrast, in the module battery in accordance with Comparative Example 2, the end cells are not configured to be held toward the center of the cell assembly by the end plate and the binding members. Therefore, at the time of charging operation, the casing deformation due to increased battery internal pressure or the expansion of the electrode groups cannot be suppressed, resulting in a most significant expansion of the electrode groups. For this reason, the contact area between the foamed nickel porous substrate or punched or perforated metal sheet making up the positive or negative electrode core and the positive or negative active material is reduced and the conductivity of the electrode decreases.

With the decrease in the conductivity of the positive and negative electrode plates, the charging efficiency of the cells decreases, thereby to increase the amount of heat generated at the time of charging operation. As shown in Table 7, the temperature at the end of charging operation of the cells making up the module battery in accordance with Comparative Example 2 is 50° to 54° C., which is 15° to 19° C. higher than that of the module battery of Example 8. The discharge capacity is 76 to 81 Ah, which is lower than that of Example 8.

Also, as seen in Table 8, this module battery shows at highest only 50% of the initial discharge capacity after 320 cycles. This is considered due to the fact that the repetitive charging and discharging operations expand the electrode group and hence reduce the conductivity of the positive and negative electrode plates, as a result of which the charging efficiency is reduced and the battery temperature rises. The performance of the negative electrode is deteriorated to reduce the discharge capacity accordingly.

According to the above-mentioned cases, the module battery includes 5 cells. Apart from this, 5 to 40 cells are appropriate for each module battery in consideration of the battery management, maintenance, replacement or portability of a pack battery.

EXAMPLE 9

Battery casings with a rib height of 0.5 mm, 1 mm and 3 mm respectively as listed in Table 9 below were prepared with the outer dimensions thereof fixed. Using these battery casings, a cell and a module battery similar to those in Example 7 were prepared. The batteries were compared for the discharge capacity by charging the module battery involved for 12 hours at a current of 10 A and discharging at a current of 20 A until the battery voltage decreased to 5 V. Also, the cycle life tests were conducted on these module batteries by repeating similar charging and discharging operations. The results of the discharge capacity test and the cycle life test are also summarized in Table 9.

TABLE 9

| Battery No. | Rib height (mm) | Discharge capacity (Ah) | Cycle life (cycle) |
|---|---|---|---|
| 31 | 0.5 | 88 | 310 |
| 32 | 1 | 98 | 900 |
| 33 | 2 | 98 | 900 |
| 34 | 3 | 90 | 720 |

As is obvious from Table 9, the battery No. 31 having a battery casing with a rib height of 0.5 mm has a low discharge capacity of 88 Ah and a short cycle life. This is because the space area width for allowing air passage formed by butted ribs between the cells is so narrow that the available air flow velocity in the space portion is only about 0 to 0.1 m/sec at the start of charging due to pressure loss, and that the heat transmitted to the casing surface fails to dissipate, thereby to increase the temperature at the end of charging of the cell. To increase the fan capacity as a means for increasing the air flow velocity in the space portion is not desirable as this would increase the power consumption of the fan. When the rib height was increased to 3 mm as in the battery No. 34, it was confirmed that the discharge capacity and the cycle life are deteriorated. The reason for this is that increased space area allowing air passage reduces the air flow velocity in the space, and the flow changes to a laminar flow, which reduces the heat dissipation efficiency at the same time. Also, since the outer dimensions of the battery casing remain the same, the resultant reduction in the space for the electrode group is undesirable in view of the volume energy density. These facts indicate that an appropriate rib height is from 1 mm to 2 mm.

EXAMPLE 10

Battery casings were prepared in a manner similar to that in Example 8 except that the rib intervals were set 5 mm, 10 mm, 15 mm or 20 mm as listed in Table 10 below. A cell and a module battery were prepared with the above-mentioned battery casings. The results of the cycle life test and the discharge capacity test conducted under the same conditions as in Example 8 are also summarized in Table 10.

TABLE 10

| Battery No. | Rib interval (mm) | Discharge capacity (Ah) | Cycle life (cycle) |
|---|---|---|---|
| 35 | 5 | 85 | 380 |
| 36 | 10 | 98 | 906 |
| 37 | 15 | 98 | 900 |
| 38 | 20 | 88 | 410 |

As is obvious from Table 10, the ribs spaced 5 mm of the battery No. 35 occupy so large a proportion of the casing surface area that the resultant reduced area allowing air flow makes it difficult to dissipate the heat generated in the electrode group. The discharge capacity decreases to 85 Ah, thereby to reduce the cycle life. In the battery No. 38 having a rib interval of 20 mm, the interval between the casings due to butted ribs is large as compared with the battery internal pressure, and therefore the casing is deformed by the heat insulating layer of air formed between the electrode group and the casing. Also, the reduced space area allowing air passage between the cells makes it difficult to dissipate the heat generated in the electrode group. The discharge capacity thus decreases to 88 Ah, thereby to shorten the cycle life. In view of this, the interval between the protruded ribs is desirably from 10 mm to 15 mm.

EXAMPLE 11

Battery casings were prepared in a manner similar to that in Example 8 except that the rib widths were set 1 mm, 3 mm, 10 mm or 15 mm as listed in Table 11 below. A cell and a module battery were prepared with the above-mentioned battery casings. The results of the cycle life test and the discharge capacity test conducted under the same conditions as in Example 8 are also summarized in Table 11.

TABLE 11

| Battery No. | Rib width (mm) | Discharge capacity (Ah) | Cycle life (cycle) |
|---|---|---|---|
| 39 | 1 | 98 | 350 |
| 40 | 3 | 98 | 900 |
| 41 | 10 | 98 | 900 |
| 42 | 15 | 85 | 380 |

As is obvious from Table 11, the 15 mm-wide ribs of the battery No. 42 occupy so large a proportion of the area of the casing surface that the resultant reduced area allowing air flow makes it difficult to dissipate the heat generated in the electrode group. The discharge capacity thus decreases to 85 Ah, thereby to reduce the cycle life. With the battery No. 39 having a rib width of 1 mm, on the other hand, the discharge capacity begins to fall sharply after 120 cycles, and the discharge capacity after 350 cycles is only 50% of the initial value. This is due to the fact that the butted portions of the ribs are broken by the expansion of the electrode group and the resultant displacement leads to an abrupt expansion of the battery casing by the battery internal pressure, which has been counterbalanced by the supporting role of the ribs, and creates a space between the electrode group and the battery casing. The created space makes it difficult to dissipate the heat generated in the electrode group, and thus the heat is accumulated inside the battery, thereby to decrease the charging efficiency extremely.

This fact shows that the desirable width of the protruded ribs is from 3 mm to 10 mm.

EXAMPLE 12

Battery casings were prepared in a manner similar to that in Example 8 except that the wall thickness of the battery casing (side wall 18) not including the rib height was set 0.5 mm, 1 mm, 3 mm or 5 as listed in Table 12 below, and a cell and a module battery were prepared with the above-mentioned battery casings of such wall thicknesses. The results of the cycle life test and the discharge capacity test conducted under the same conditions as in Example 8 are also summarized in Table 12.

TABLE 12

| Battery No. | Thickness of side wall 18 of casing (mm) | Discharge capacity (Ah) | Cycle life (cycle) |
| --- | --- | --- | --- |
| 43 | 0.5 | 85 | 380 |
| 44 | 1 | 98 | 900 |
| 45 | 3 | 98 | 900 |
| 46 | 5 | 88 | 400 |

As is obvious from Table 12, the battery No. 43 has a wall thickness of the battery casing of 0.5 mm. Due to this small thickness against the battery inner pressure, the battery casing is deformed, a heat insulating layer of air is formed between the electrode group and the casing, and the air space area allowing the air to pass through the space between the cells is reduced in width. Consequently, the heat generated in the electrode group is difficult to dissipate, so that the discharge capacity falls to 85 Ah and the cycle life is shortened. With regard to the battery No. 46 having a casing wall thickness of 5 mm, on the other hand, the large casing wall thickness makes it difficult to dissipate the heat generated in the electrode group and the discharge capacity falls to 88 Ah, thereby to reduce the cycle life.

All of these facts indicate that the casing wall thickness of from 1 mm to 3 mm is preferable.

EXAMPLE 13

Battery casings were prepared in a manner similar to that in Example 8 except that the thickness of the narrow side wall 19 of the battery casing different from the direction of stacking was set 1 mm, 3 mm, 5 mm or 7 mm as listed in Table 13 below, and a cell and a module battery were prepared with the above-mentioned battery casings of such wall thicknesses. The results of the cycle life test and the discharge capacity test conducted under the same conditions as in Example 8 are also summarized in Table 13.

TABLE 13

| Battery No. | Thickness of side wall 19 of the casing (mm) | Discharge capacity (Ah) | Cycle life (cycle) |
| --- | --- | --- | --- |
| 47 | 1 | 98 | 110 |
| 48 | 3 | 98 | 900 |
| 49 | 5 | 98 | 900 |
| 50 | 7 | 94 | 620 |

As is obvious from Table 13, the battery No. 47 having a narrow side wall thickness of the battery casing of 1.0 mm has a short cycle life of 110 cycles. This is because the strength of the side wall of the casing is insufficient to accommodate the rise in the battery internal pressure and a cracking occurs at a stress-concentrated portion around 100 cycles, leading to the leakage of the electrolyte. This is also the case with the thickness of the bottom of the casing and the lid. With the battery No. 50 having a side wall thickness of the casing of 7.0 mm, however, the discharge capacity falls with the decrease in heat dissipation from the side walls of the casing, thereby to shorten the cycle life thereof. From the viewpoint of volumetric energy density, the thickness of the side wall and bottom of the casing is desirably from 3 mm to 5 mm. Further, the casing bottom is preferably formed with reinforcing protrusions or recesses.

It is understood that various other modifications will be apparent to and can readily be made by those skilled in the art without departing from the scope and spirit of this invention. Accordingly, it is not intended that the claims be construed as encompassing all the features of patentable novelty that reside in the present invention, including all features that would be treated as equivalents thereof by those skilled in the art to which this invention pertains.

What is claimed is:

1. A cell for sealed nickel-metal hydride storage battery comprising:

a vessel made of a synthetic resin which accommodates a power-generating unit including;

a negative electrode composed mainly of hydrogen storage alloy, a positive electrode composed mainly of a nickel oxide, a separator placed between both electrodes, and an alkaline electrolyte;

a lid for sealing an open end of said vessel, and a resettable safety vent provided on said lid; wherein, a hydrogen equilibrium pressure of said hydrogen storage alloy is 0.01–0.1 MPa at 45° C., when the atomic ratio of the absorbed hydrogen to the alloy H/M is 0.5, an operation pressure of said safety vent is 0.2–0.8 MPa, and a pressure-resistant strength of the casing configured with said vessel and lid is in a range of 0.7–2.0 MPa and set higher than the operation pressure of the safety vent by 0.5 MPa or more.

2. A module battery having a plurality of cells for sealed nickel-metal hydride storage battery comprising:

a vessel having a plurality of cells made of a synthetic resin which accommodates a power-generating unit including;

a negative electrode composed mainly of hydrogen storage alloy, a positive electrode composed mainly of a nickel oxide, a separator placed between the both electrodes, and an alkaline electrolyte;

a plurality of lids each for sealing respective open ends of said cells in said vessel, and a plurality of resettable safety vents provided on the respective lids; wherein, a hydrogen equilibrium pressure of said hydrogen storage alloy is 0.01–0.1 MPa at 45° C., when the atomic ratio H/M of the absorbed hydrogen to the alloy is 0.5, an operation pressure of said safety valve is 0.2–0.8 MPa, and a pressure-resistant strength of the battery casing configured with said vessel and lid is in a range of 0.7–2.0 MPa and set higher than the operation pressure of the safety vent by 0.5 MPa or more.

3. The module battery in accordance with claim 2, wherein a theoretical discharge capacity ratio of the negative electrode to the positive electrode is from 1.2 to 2.0.

4. The module battery in accordance with claim 2, wherein an amount of the electrolyte is from 1.3 cm$^3$ to 2.8 cm$^3$ per 1 Ah of the theoretical discharge capacity of the positive electrode.

5. The module battery in accordance with claim 2, wherein the electrolyte is made up of two components of potassium hydroxide and lithium hydroxide, or three components of sodium hydroxide and said two components, and its density is from 1.2 g/cm$^3$ to 1.4 g/cm$^3$.

6. The module battery in accordance with claim 2, wherein the vessel and the lid are made of a synthetic resin having a bending elastic modulus of from 14,000 kg/cm$^2$ to 28,000 kg/cm$^2$.

7. The module battery in accordance with claim 2, wherein a thickness of the side walls of said vessel is from 1 mm to 3 mm, a rib height of said ribs is from 1 mm to 2 mm, an interval between said ribs is from 10 mm to 15 mm, and a rib width of said ribs is from 3 to 10 mm.

8. A module battery for a sealed nickel-metal hydride storage battery comprising 5–40 of the cells in accordance with claim 1 stacked in one direction forming a stacked assembly; wherein said cells are bound in a direction of stacking of cells by binding members connecting end plates to each other provided on both ends in a stacked assembly, and spaces for allowing air flow between said cells are formed by a plurality of parallel ribs formed in butted relation with each other on the outer surfaces of the side wall of said battery casing in the direction of stacking.

9. The module battery in accordance with claim 8, wherein a theoretical discharge capacity ratio of the negative electrode to the positive electrode is from 1.2 to 2.0.

10. The module battery in accordance with claim 8, wherein an amount of the electrolyte is from 1.3 cm$^3$ to 2.8 cm$^3$ per 1 Ah of the theoretical discharge capacity of the positive electrode.

11. The module battery in accordance with claim 8, wherein the electrolyte is made up of two components of potassium hydroxide and lithium hydroxide, or three components of sodium hydroxide and said two components, and its density is from 1.2 g/cm$^3$ to 1.4 g/cm$^3$.

12. The module battery in accordance with claim 8, wherein the vessel and the lid are made of a synthetic resin having a bending elastic modulus of from 14,000 kg/cm$^2$ to 28,000 kg/cm$^2$.

13. The module battery in accordance with claim 8, wherein a thickness of the side walls of said vessel is from 1 mm to 3 mm, a rib height of said ribs is from 1 mm to 2 mm, an interval between said ribs is from 10 mm to 15 mm, and a rib width of said ribs is from 3 to 10 mm.

* * * * *